US008541977B2

(12) United States Patent
Hasegawa et al.

(10) Patent No.: US 8,541,977 B2
(45) Date of Patent: Sep. 24, 2013

(54) COIL UNIT AND ELECTRONIC INSTRUMENT

(75) Inventors: Minoru Hasegawa, Suwa (JP); Hirofumi Okada, Suwa (JP); Yoichiro Kondo, Chino (JP)

(73) Assignee: Seiko Epson Corporation, Tokyo (JP)

( * ) Notice: Subject to any disclaimer, the term of this patent is extended or adjusted under 35 U.S.C. 154(b) by 1464 days.

(21) Appl. No.: 12/176,072

(22) Filed: Jul. 18, 2008

(65) Prior Publication Data

US 2009/0021212 A1 Jan. 22, 2009

(30) Foreign Application Priority Data

Jul. 20, 2007 (JP) ................................ 2007-189812

(51) Int. Cl.
*H01M 6/50* (2006.01)

(52) U.S. Cl.
USPC ............................ 320/109; 320/108; 336/200

(58) Field of Classification Search
None
See application file for complete search history.

(56) References Cited

U.S. PATENT DOCUMENTS

| | | | | |
|---|---|---|---|---|
| 2,078,694 | A * | 4/1937 | Smith | 219/79 |
| 5,594,317 | A | 1/1997 | Yeow et al. | |
| 6,008,622 | A | 12/1999 | Nakawatase | |
| 6,593,841 | B1 * | 7/2003 | Mizoguchi et al. | 336/200 |
| 6,998,939 | B2 * | 2/2006 | Nakayama et al. | 333/181 |
| 2001/0002786 | A1 * | 6/2001 | Najima | 320/108 |
| 2003/0020583 | A1 * | 1/2003 | Hui et al. | 336/200 |
| 2004/0108934 | A1 * | 6/2004 | Choi et al. | 336/200 |
| 2007/0090790 | A1 * | 4/2007 | Hui | 320/108 |
| 2008/0111518 | A1 * | 5/2008 | Toya | 320/108 |
| 2008/0311769 | A1 * | 12/2008 | Yamada et al. | 439/68 |

FOREIGN PATENT DOCUMENTS

| | | |
|---|---|---|
| DE | 199 46 455 A1 | 4/2000 |
| DE | 10 2004 032 788 A1 | 2/2006 |
| JP | U 03-090371 | 9/1991 |
| JP | A 8-14360 | 1/1996 |
| JP | A 8-103028 | 4/1996 |
| JP | A 08-316069 | 11/1996 |
| JP | A 11-98705 | 4/1999 |
| JP | A 11-103531 | 4/1999 |
| JP | A 2000-091884 | 3/2000 |
| JP | A 2000-323340 | 11/2000 |
| JP | A 2003-272938 | 9/2003 |
| JP | A 2005-109173 | 4/2005 |
| JP | A 2005-110357 | 4/2005 |

(Continued)

OTHER PUBLICATIONS

Feb. 25, 2010 Search Report issued in European Patent Application No. 08013034.7.

(Continued)

*Primary Examiner* — Jermele M Hollington
*Assistant Examiner* — Temilade S Rhodes-Vivour
(74) *Attorney, Agent, or Firm* — Oliff & Berridge, PLC

(57) ABSTRACT

A coil unit includes a planar coil that has a transmission side and a non-transmission side, a magnetic sheet provided over the non-transmission side of the planar coil, and a heat sink/magnetic shield plate stacked on a side of the magnetic sheet opposite to a side that faces the planar coil, the heat sink/magnetic shield plate dissipating heat generated by the planar coil and shielding magnetism by absorbing a magnetic flux that has not been absorbed by the magnetic sheet. The heat sink/magnetic shield plate has a thickness larger than that of the magnetic sheet.

14 Claims, 6 Drawing Sheets

(56) References Cited

FOREIGN PATENT DOCUMENTS

| | | |
|---|---|---|
| JP | A 2005-278339 | 10/2005 |
| JP | A 2006-42519 | 2/2006 |
| JP | A-2006-115592 | 4/2006 |

OTHER PUBLICATIONS

European Search Report issued in corresponding European Patent Application No. 08011418.4, mailed 3/17/10.

* cited by examiner

COIL UNIT AND ELECTRONIC INSTRUMENT

Japanese Patent Application No. 2007-189812 filed on Jul. 20, 2007, is hereby incorporated by reference in its entirety.

BACKGROUND OF THE INVENTION

The present invention relates to a coil unit utilized for non-contact power transmission using a coil, an electronic instrument, and the like.

Non-contact power transmission that utilizes electromagnetic induction to enable power transmission without metal-to-metal contact has been known. As application examples of non-contact power transmission, charging a portable telephone, charging a household appliance (e.g., telephone handset), and the like have been proposed.

Non-contact power transmission has a problem in that a transmission coil generates heat. Technologies for suppressing such heat generation have been proposed. JP-A-8-103028 discloses a design method that suppresses heat generation during non-contact charging. JP-A-8-148360 discloses technology that suppresses heat generation by adapting a suitable configuration of a coil and a magnetic material. JP-A-11-98705 discloses a non-contact charging device provided with an air-cooling mechanism. JP-A-2003-272938 discloses a structure in which a ceramic is disposed between a primary coil and a secondary coil to dissipate heat. JP-A-2005-110357 discloses the structure of a housing with an improved heat dissipation capability.

SUMMARY

According to one aspect of the invention, there is provided a coil unit comprising:

a planar coil that has a transmission side and a non-transmission side;

a magnetic sheet provided over the non-transmission side of the planar coil; and a heat sink/magnetic shield plate stacked on a side of the magnetic sheet opposite to a side that faces the planar coil, the heat sink/magnetic shield plate dissipating heat generated by the planar coil and shielding magnetism by absorbing a magnetic flux that has not been absorbed by the magnetic sheet, the heat sink/magnetic shield plate having a thickness larger than that of the magnetic sheet.

According to another aspect of the invention, there is provided a coil unit comprising:

a coil;

a magnetic material disposed near the coil; and a member disposed so that the magnetic material is placed between the coil and the member, the member having a thickness larger than that of the magnetic material.

According to another aspect of the invention, there is provided an electronic instrument comprising one of the above coil units.

DETAILED DESCRIPTION OF THE EMBODIMENT

Figure 1:
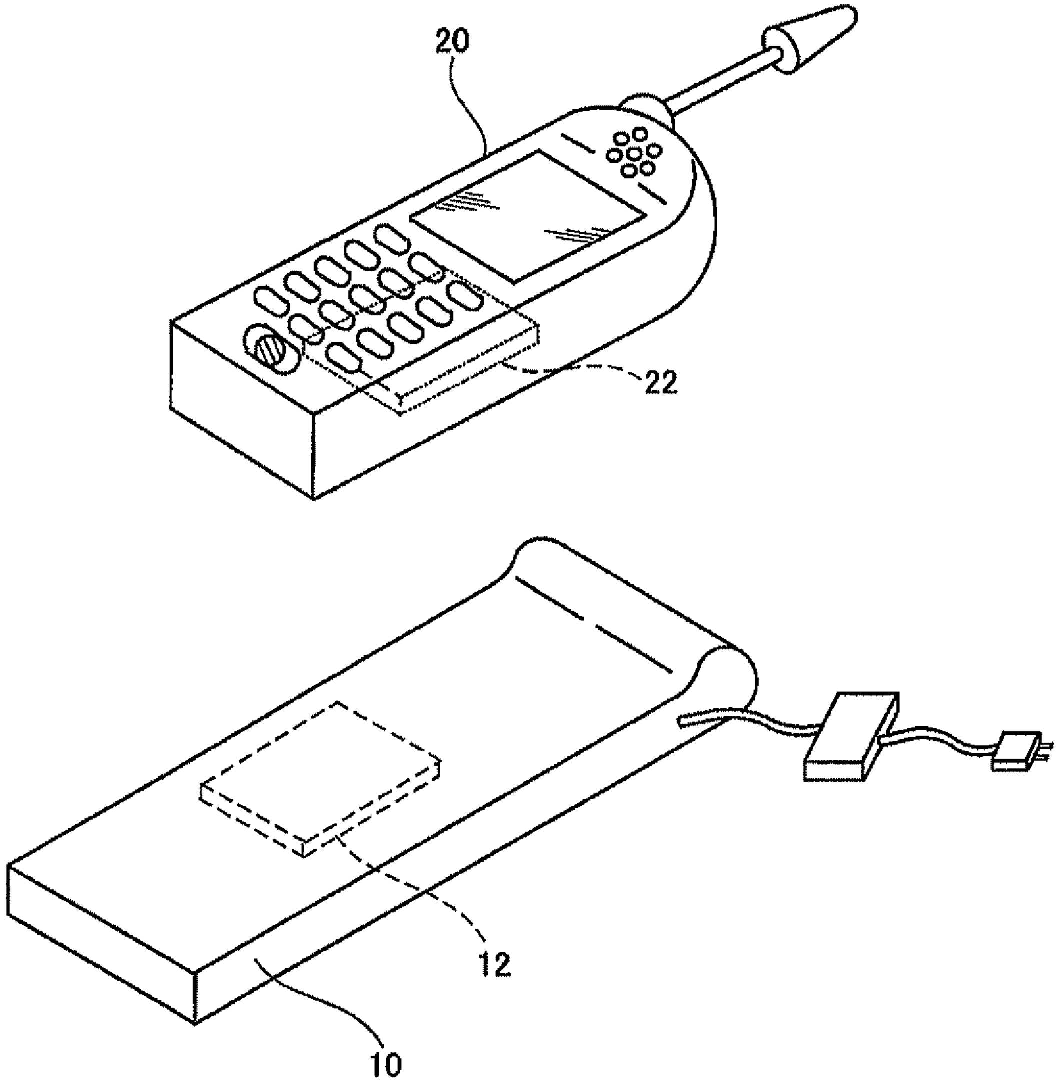
FIG. 1 is a view schematically showing a charger and a charging target.

Several aspects of the invention may provide a coil unit that exhibits excellent heat dissipation capability and can be reduced in thickness, and an electronic instrument using the coil unit.

According to one embodiment of the invention, there is provided a coil unit comprising:

a planar coil that has a transmission side and a non-transmission side;

a magnetic sheet provided over the non-transmission side of the planar coil; and a heat sink/magnetic shield plate stacked on a side of the magnetic sheet opposite to a side that faces the planar coil, the heat sink/magnetic shield plate dissipating heat generated by the planar coil and shielding magnetism by absorbing a magnetic flux that has not been absorbed by the magnetic sheet, the heat sink/magnetic shield plate having a thickness larger than that of the magnetic sheet.

Heat generated by the planar coil is dissipated through solid heat conduction of the magnetic sheet and the heat sink/magnetic shield plate stacked on the planar coil. The heat sink/magnetic shield plate has a function of a heat sink and a function of a magnetic shield that absorbs a magnetic flux which has not been absorbed by the magnetic sheet. As the material for the heat sink/magnetic shield plate, a non-magnetic material (i.e., a generic name for a diamagnetic material, a paramagnetic material, and an antiferromagnetic material) may be used. Aluminum or copper may be suitably used as the material for the heat sink/magnetic shield plate.

The heat sink/magnetic shield plate is formed to have a thickness larger than that of the magnetic sheet. A magnetic flux which has not been absorbed by the magnetic sheet is absorbed by the heat sink/magnetic shield plate. In this case, the heat sink/magnetic shield plate is inductively heated by a magnetic flux which has not been absorbed by the magnetic sheet. However, since the heat sink/magnetic shield plate has a given thickness, the heat sink/magnetic shield plate has a relatively large heat capacity and a low heat generation temperature. Moreover, the heat sink/magnetic shield plate easily dissipates heat due to its dissipation characteristics. Therefore, heat generated by the planar coil can be dissipated efficiently. Moreover, the coil unit can be formed to have a thickness as thin as about 1.65 mm, for example.

The coil unit may further include:

a substrate, the heat sink/magnetic shield plate being secured on the substrate; and a temperature detection element provided on the substrate, the temperature detection element detecting the temperature of the planar coil due to heat generation that is transferred through solid heat conduction of the magnetic sheet and the heat sink/magnetic shield plate.

This enables detection of an abnormality when the temperature of the heat sink/magnetic shield plate increases to a large extent due to an increase in temperature of the coil caused by insertion of a foreign object, for example.

In the coil unit, heat transfer conductive patterns may be formed on a front side and a back side of the substrate, the front side facing the heat sink/magnetic shield plate; and the temperature detection element may be provided on the back side of the substrate.

According to this configuration, heat generated by the planar coil is transferred to the temperature detection element through solid heat conduction of the magnetic sheet, the heat sink/magnetic shield plate, the heat transfer conductive pattern on the front side, the substrate, and the heat transfer conductive pattern on the back side. Moreover, since the temperature detection element is provided on the back side of the substrate, the temperature detection element does not interfere with the heat sink/magnetic shield plate.

In the coil unit, the heat transfer conductive patterns formed on the front side and the back side of the substrate may be connected via a through-hole formed through the substrate. The substrate is an insulator and has low heat transfer properties. However, the heat transfer properties can be improved by providing the through-hole.

In the coil unit, a depression may be formed in a side of the heat sink/magnetic shield plate that faces the substrate; and the temperature detection element may be provided on a front side of the substrate and disposed inside the depression formed in the heat sink/magnetic shield plate, the front side of the substrate facing the heat sink/magnetic shield plate. According to this configuration, even if the temperature detection element is provided on the front side of the substrate, the temperature detection element does not interfere with the heat sink/magnetic shield plate. When the planar coil has an air-core section at the center of the planar coil, a hole may be formed in the heat sink/magnetic shield plate as a depression at a position corresponding to the air-core section. According to one embodiment of the invention, since the heat sink/magnetic shield plate has a given thickness, the heat sink/magnetic shield plate can have a thickness sufficient to receive the temperature detection element. When employing the above structure, a heat transfer conductive pattern may be formed on the front side of the substrate.

In the coil unit, the temperature detection element may be an element that breaks or suppresses power supplied to the planar coil based on the temperature of the planar coil due to heat generation. This makes it possible to stop or suppress power supplied to the planar coil when an abnormality has occurred. Examples of the temperature detection element include a thermistor of which the resistance increases at a high temperature to suppress or break current, and an element (e.g., fuse) that is melted at a high temperature to break current.

The coil unit may further include a covering member that covers an edge of the magnetic sheet. The edge of the magnetic sheet is fragile and is easily removed. However, the material of the edge of the magnetic sheet can be prevented from being scattered by covering the edge of the magnetic sheet with the protective sheet. The covering member may be formed using an insulating sheet or a sealing member (e.g., silicone).

In the coil unit, the covering member may be a protective sheet having a hole that receives the planar coil, the protective sheet covering edges of the magnetic sheet and the heat sink/magnetic shield plate and securing the magnetic sheet and the heat sink/magnetic shield plate on a front side of the substrate. According to this configuration, the covering member can also be used as a member for securing the magnetic sheet and the heat sink/magnetic shield plate.

In one embodiment of the invention, a plurality of the magnetic sheets may be provided. When magnetic saturation occurs using only one magnetic sheet when a large current flows through the planar coil (e.g., when power is turned ON), a leakage flux can be reduced by providing a plurality of magnetic sheets. The heat sink/magnetic shield plate has a thickness larger than the total thickness of the plurality of magnetic sheets.

In the coil unit, the planar coil may have an inner end lead line and an outer end lead line, the inner end lead line being provided over the non-transmission side of the planar coil; and a spacer member may be disposed between the planar coil and the magnetic sheet, the spacer member having a thickness substantially equal to the thickness of the inner end lead line.

This allows the transmission side of the planar coil to be made flat so that the primary coil and the secondary coil are easily disposed adjacently when performing non-contact power transmission. Although the non-transmission side of the planar coil protrudes due to the inner end lead line, the non-transmission side of the planar coil can be made flat and caused to adhere to the magnetic sheet by utilizing the spacer member. The heat transfer properties can thus be maintained.

In the coil unit, the substrate may have a mounting surface provided with a mounted component in an area that extends from an area that faces the heat sink/magnetic shield plate, and the mounting surface may be provided on the back side of the substrate.

According to this configuration, since only the planar coil, the magnetic sheet, and the heat sink/magnetic shield plate protrude from the front side of the substrate, the primary coil and the secondary coil are easily disposed adjacently when performing non-contact power transmission.

According to another embodiment of the invention, there is provided a coil unit comprising:

a coil;

a magnetic material disposed near the coil; and a member disposed so that the magnetic material is placed between the coil and the member, the member having a thickness larger than that of the magnetic material.

According to another embodiment of the invention, the magnetic sheet according to one embodiment of the invention may be the magnetic material, and the heat sink/magnetic shield plate may be the member disposed so that the magnetic material is placed between the coil and the member. In this case the member is inductively heated by a magnetic flux which has not been absorbed by the magnetic material. However, since the member thicker than the magnetic material has a given thickness, the member has a relatively large heat capacity and a low heat generation temperature. Therefore, the member can dissipate heat generated by the planar coil without overheating.

According to another embodiment of the invention, there is provided an electronic instrument comprising one of the above coil units.

Preferred embodiments of the invention are described in detail below. Note that the following embodiments do not in any way limit the scope of the invention defined by the claims laid out herein. Note that all elements of the following embodiments should not necessarily be taken as essential requirements for the invention.

1. Charging System

FIG. 1 is a view schematically showing a charger 10 and a charging target 20. A secondary-side electronic instrument (e.g., portable telephone 20) is charged using a primary-side electronic instrument (e.g., charger 10) by non-contact power transmission utilizing electromagnetic induction that occurs between a coil of a coil unit 12 of the charger 10 and a coil of a coil unit 22 of the portable telephone 20.

Opposite sides of the coil units 12 and 22 when performing non-contact power transmission as shown in FIG. 1 are referred to as transmission sides. In FIG. 1, the upper side of the coil unit 12 is the transmission side, and the lower side of the coil unit 22 is the transmission side. The side opposite to the transmission side is referred to as a non-transmission side.

2. Structure of Coil Unit

The configurations of the coil units 12 and 22 are described below with reference to FIGS. 2, 3A, and 3B taking the coil unit 12 as an example. Note that the structure shown in FIG. 2 may also be applied to the coil unit 22.

Figure 2:
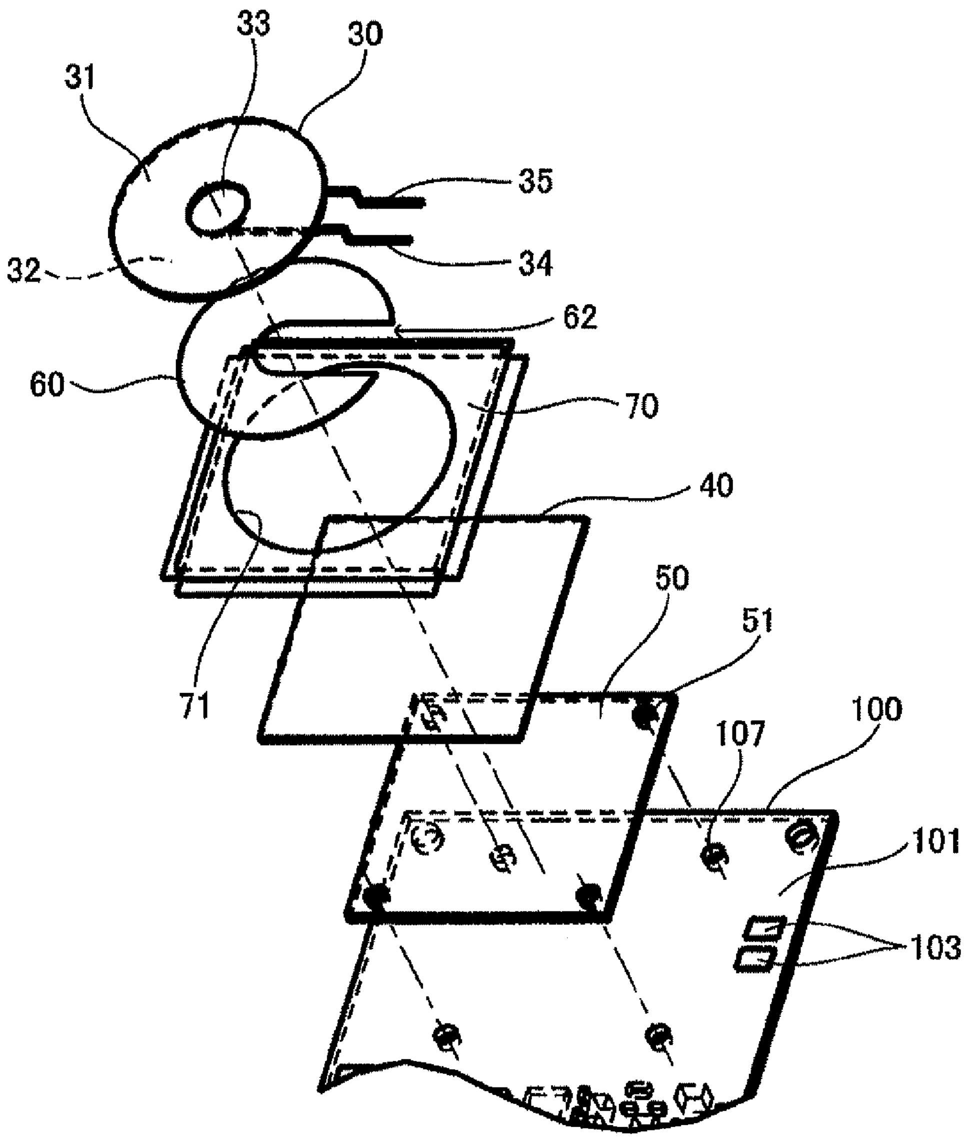
FIG. 2 is an exploded oblique view showing a coil unit.
Figure 3B:
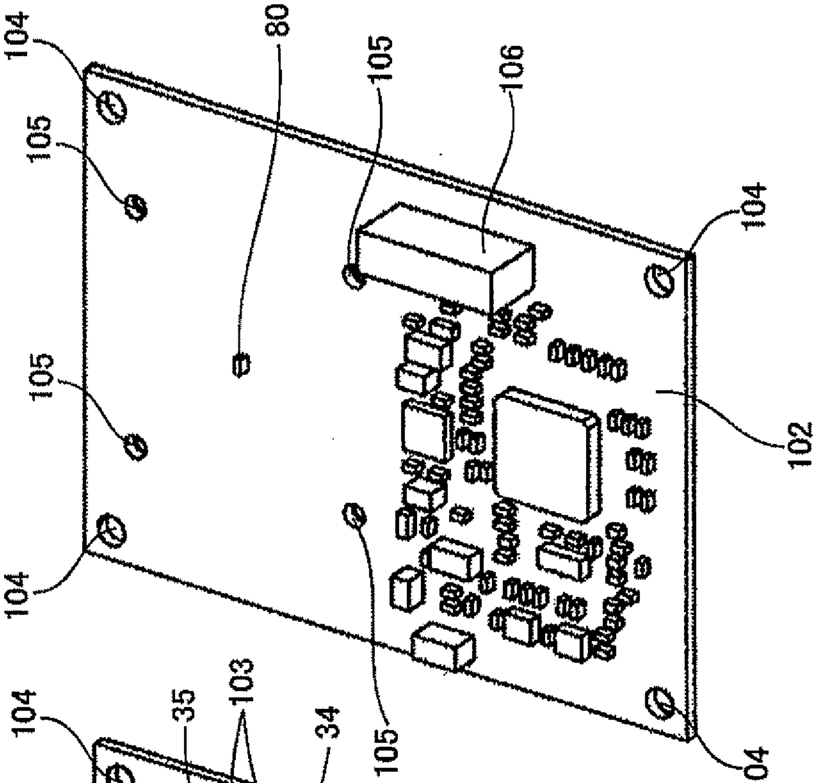
FIG. 3B is an oblique view showing a coil unit from the back side.
Figure 3A:
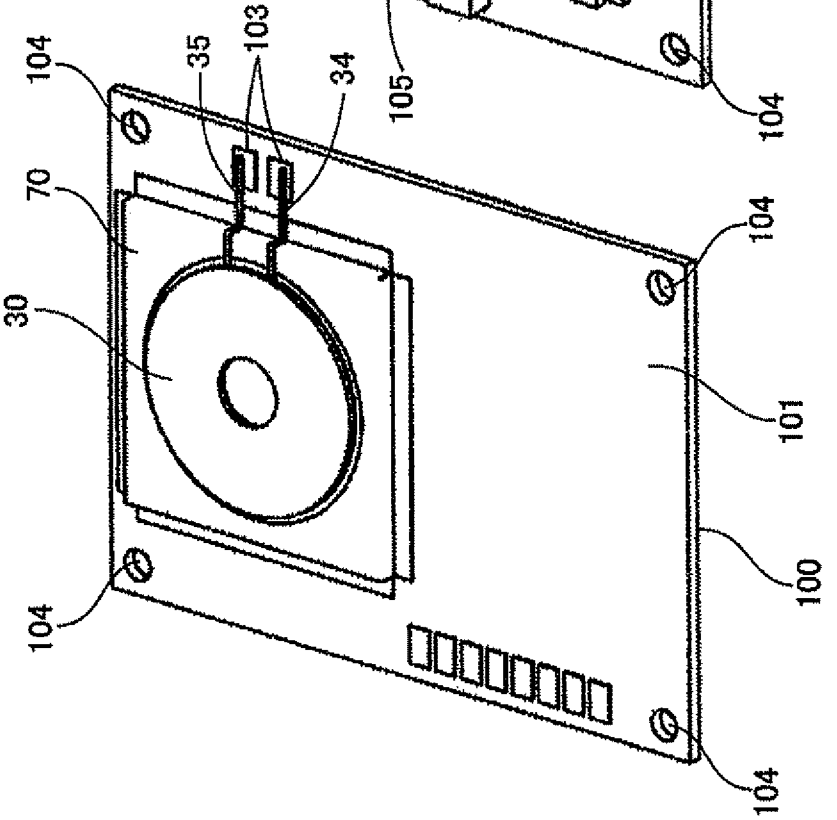
FIG. 3A is an oblique view showing a coil unit from the front side.

FIG. 2 is an exploded oblique view showing the coil unit 12, FIG. 3A is an oblique view showing the coil unit 12 from the front side, and FIG. 3B is an oblique view showing the coil unit 12 from the back side.

In FIG. 2, the coil unit 12 is basically configured to include a planar coil (coil) 30 that has a transmission side 31 and a non-transmission side 32, a magnetic sheet 40 provided over the non-transmission side 32 of the planar coil 30, and a heat sink/magnetic shield plate 50 stacked on the side of the magnetic sheet opposite to the side that faces the planar coil 30.

The planar coil 30 is not particularly limited insofar as the planar coil 30 is a flat (planar) coil. For example, an air-core coil formed by winding a single-core or multi-core coated coil wire in a plane may be used as the planar coil 30. In this embodiment, the planar coil 30 has an air-core section 33 at the center of the planar coil 30. The planar coil 30 includes an inner end lead line 34 connected to the inner end of the spiral, and an outer end lead line 35 connected to the outer end of the spiral. In this embodiment, the inner end lead line 34 is provided toward the outside in the radial direction through the non-transmission side 32 of the planar coil 30. This allows the transmission side 31 of the planar coil 30 to be made flat so that the primary coil and the secondary coil are easily disposed adjacently when performing non-contact power transmission.

The magnetic sheet (magnetic material) 40 disposed over the non-transmission side 32 of the planar coil 30 is formed to have a size sufficient to cover the planar coil 30. The magnetic sheet 40 receives a magnetic flux from the planar coil 30 to increase the inductance of the planar coil 30. A soft magnetic material is preferably used as the material for the magnetic sheet 40. A soft magnetic ferrite material or a soft magnetic metal material may be used as the material for the magnetic sheet 40.

The heat sink/magnetic shield plate 50 is disposed on the side of the magnetic sheet 40 opposite to the side that faces the planar coil 30. The thickness of the heat sink/magnetic shield plate 50 is larger than that of the magnetic sheet 40. The heat sink/magnetic shield plate 50 has a function of a heat sink and a function of a magnetic shield that absorbs a magnetic flux which has not been absorbed by the magnetic sheet 40. As the material for the heat sink/magnetic shield plate 50, a non-magnetic material (i.e., a generic name for a diamagnetic material, a paramagnetic material, and an antiferromagnetic material) may be used. Aluminum or copper may be suitably used as the material for the heat sink/magnetic shield plate 50.

Heat generated by the planar coil 30 when a current is caused to flow through the planar coil 30 is dissipated utilizing solid heat conduction of the magnetic sheet 40 and the heat sink/magnetic shield plate 50 stacked on the planar coil 30. A magnetic flux which has not been absorbed by the magnetic sheet 40 is absorbed by the heat sink/magnetic shield plate 50. In this case, the heat sink/magnetic shield plate 50 is inductively heated by a magnetic flux which has not been absorbed by the magnetic sheet 40. However, since the heat sink/magnetic shield plate 50 has a given thickness, the heat sink/magnetic shield plate 50 has a relatively large heat capacity and a low heat generation temperature. Moreover, the heat sink/magnetic shield plate 50 easily dissipates heat due to its dissipation characteristics. Therefore, heat generated by the planar coil 30 can be dissipated efficiently. In this embodiment, the total thickness of the planar coil 30, the magnetic sheet 40, and the heat sink/magnetic shield plate 50 can be reduced to about 1.65 mm, for example.

In this embodiment, a spacer member 60 having a thickness substantially equal to the thickness of the inner end lead line 34 is provided between the planar coil 30 and the magnetic sheet 40. The spacer member 60 is formed in the shape of a circle having almost the same diameter as that of the planar coil 30, and has a slit 62 so as to avoid at least the inner end lead line 34. The spacer member 60 is a double-sided adhesive sheet, for example. The spacer member 60 bonds the planar coil 30 to the magnetic sheet 40.

In this embodiment, although the non-transmission side 32 of the planar coil 30 protrudes due to the inner end lead line 34, the non-transmission side 32 of the planar coil 30 can be made flat and caused to adhere to the magnetic sheet 40 by utilizing the spacer member 60. The heat transfer properties can thus be maintained.

In this embodiment, the coil unit 12 includes a substrate 100 on which the heat sink/magnetic shield plate 50 is secured. In this case, the heat sink/magnetic shield plate 50 dissipates heat to the substrate 100. The substrate 100 has coil connection pads 103 connected to the inner end lead line 34 and the outer end lead line 35 of the planar coil 30.

The coil unit 12 includes a protective sheet 70 that covers the edge of the magnetic sheet 40 and the heat sink/magnetic shield plate 50 and secures (bonds) the magnetic sheet 40 and the heat sink/magnetic shield plate 50 to a surface 101 of the substrate 100. In this case, the inner end lead line 34 and the outer end lead line 35 of the planar coil 30 are connected to the coil connection pads 103 of the substrate 100 to pass over the protective sheet 70 (see FIG. 3A). The protective sheet 70 has a hole 71 that receives the planar coil 30. The protective sheet 70 also functions as a covering member that covers the edge of the magnetic sheet 40. The edge of the magnetic sheet 40 is fragile and is easily removed. However, the material of the edge of the magnetic sheet 40 can be prevented from being scattered by covering the edge of the magnetic sheet 40 with the protective sheet 70 (i.e., covering member). The covering member may be formed of a sealing member (e.g., silicone) instead of the protective sheet 70.

The coil unit 12 is produced as follows. The magnetic sheet 40 and the heat sink/magnetic shield plate 50 are stacked on the substrate 100. In this case, the substrate 100 is positioned on a jig (not shown) by utilizing holes 104 formed at the four corners of the substrate 100. Positioning pins that protrude from the jig are fitted into the holes 104 (e.g., four holes) formed in the substrate 100, holes 51 (e.g., four holes) formed in the heat sink/magnetic shield plate 50, and holes 107 formed in the substrate 100 corresponding to the holes 51. The heat sink/magnetic shield plate 50 is thus positioned with respect to the substrate 100 placed on the jig. The magnetic sheet 40 is then placed on the heat sink/magnetic shield plate 50, and the magnetic sheet 40 is covered with the protective sheet 70 so that the magnetic sheet 40 and the heat sink/magnetic shield plate 50 are secured on the substrate 100 using the protective sheet 70.

The planar coil 30 is then secured (bonded) on the magnetic sheet 40 through the spacer member 60 inside the hole 71 formed in the protective sheet 70. The inner end lead line 34 and the outer end lead line 35 of the planar coil 30 are then connected to the coil connection terminals 103 of the substrate 100 to obtain the coil unit 12.

As shown in FIG. 3B, the coil unit 12 according to this embodiment includes a temperature detection element 80 that is provided on a back side 102 of the substrate 100 and detects the temperature of the planar coil 30 due to heat generation that is transferred through solid heat conduction of the magnetic sheet 40 and the heat sink/magnetic shield plate 50, for example. Even if a foreign object or the like has been inserted between the primary coil and the secondary coil so that the temperature of the primary-side planar coil 30 has increased abnormally, the abnormality can be detected by the temperature detection element 80. Power transmission may be stopped when the temperature detection element 80 has detected that the temperature of the planar coil 30 has increased abnormally. The temperature detection element 80 is not particularly limited insofar as the temperature detection element 80 has a temperature detecting function. In this embodiment, the temperature detection element 80 is formed using a thermistor of which the resistance increases at a high temperature to suppress or break current, for example. An element (e.g., fuse) that is melted at a high temperature to break current may be used instead of a thermistor. This makes it possible to break or suppress a current that flows through the planar coil 30 when the temperature of the heat sink/magnetic shield plate has abnormally increased due to an increase in temperature of the planar coil 30 caused by insertion of a foreign object or the like.

Figure 4:
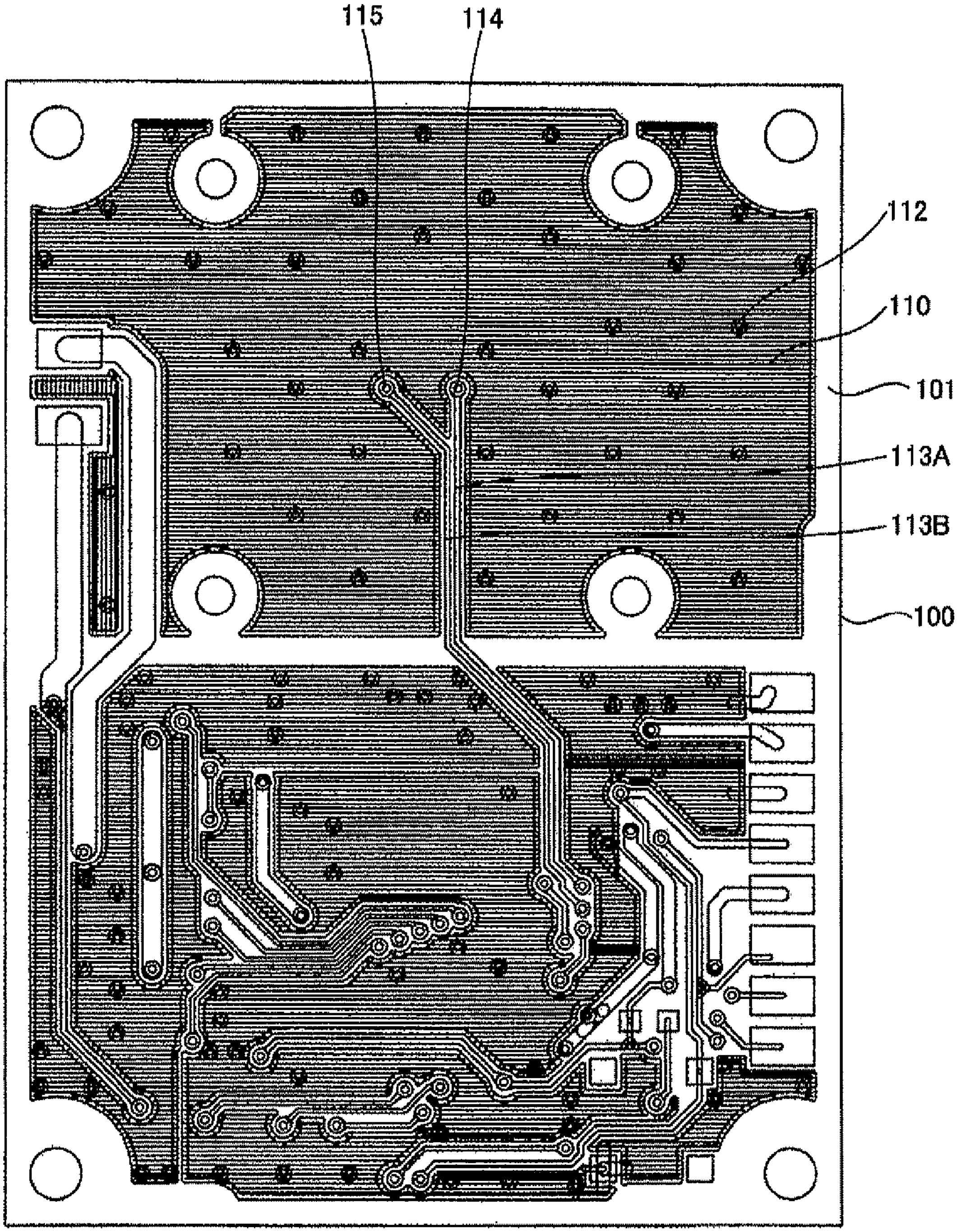
FIG. 4 is an oblique view showing a substrate from the front side.
Figure 5:
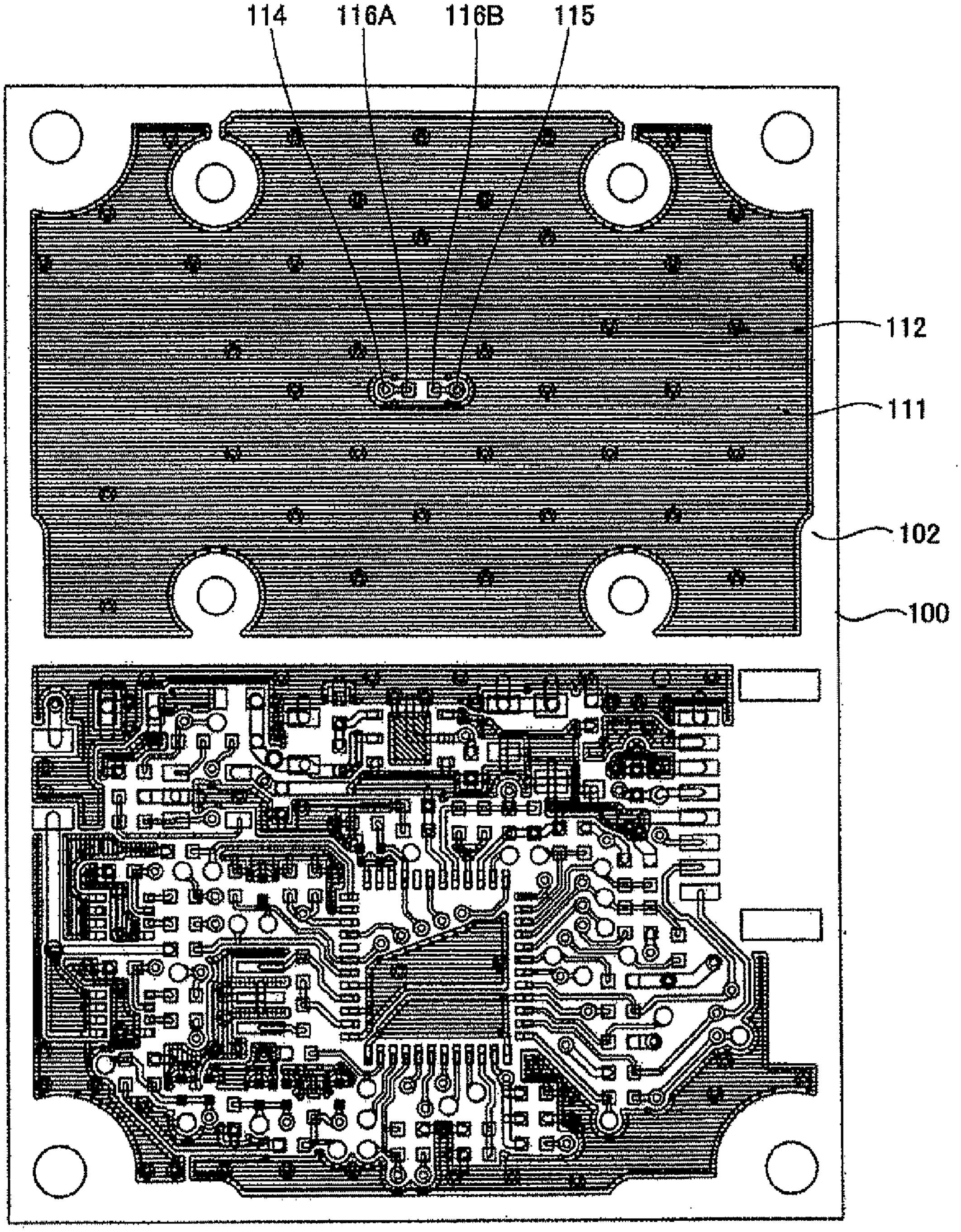
FIG. 5 is an oblique view showing a substrate from the back side.

FIG. 4 is a wiring pattern diagram showing the front side 101 of the substrate 100, and FIG. 5 is a wiring pattern diagram showing the back side 102 of the substrate 100. As shown in FIGS. 4 and 5, heat transfer conductive patterns 110 and 111 are formed on the front side 101 and the back side 102 of the substrate 100 over almost the entire area that faces the heat sink/magnetic shield plate 50. The heat transfer conductive patterns 110 and 111 on the front side 101 and the back side 102 of the substrate 100 are connected via a plurality of through-holes 112.

Thermistor wiring patterns 113A and 113B insulated from the heat sink/magnetic shield plate 50 and the heat transfer conductive pattern 110 are formed on the front side 101 of the substrate 100 shown in FIG. 4. The thermistor wiring patterns 113 are connected to thermistor connection patterns 116A and 116B formed on the back side 102 of the substrate 100 shown in FIG. 5 via two through-holes 114 and 115. The thermistor connection patterns 116A and 116B are insulated from the heat transfer conductive pattern 111.

According to this configuration, heat generated by the planar coil 30 is transferred to the temperature detection element 80 (omitted in FIG. 5) through solid heat conduction of the magnetic sheet 40, the heat sink/magnetic shield plate 50, the heat transfer conductive pattern on the front side 101 of the substrate 100, the through-hole 112, and the heat transfer conductive pattern 111 on the back side 102 of the substrate 100. Moreover, since the temperature detection element 80 is provided on the back side 102 of the substrate 100, the temperature detection element 80 does not interfere with the heat sink/magnetic shield plate 50. Note that the thermistor wiring patterns 113A and 113 B may be provided on the back side 102 of the substrate 100, and the heat transfer conductive pattern 110 may be formed all over the front side 111 of the substrate 100.

Note that the heat transfer conductive patterns 110 and 111 formed on the front side 101 and the back side 102 of the substrate 100 may not be connected via the through-holes 112 formed through the substrate 100. For example, when the thickness of the substrate 100 is sufficiently small, heat may be transferred through an insulating material of the substrate 100.

In this embodiment, as shown in FIG. 3B, the substrate 100 has a mounting surface provided with a mounted component 106 in an area that extends from the area that faces the heat sink/magnetic shield plate 50. The mounting surface is provided on the back side 102 opposite to the front side 101 that faces the heat sink/magnetic shield plate 50.

Therefore, since only the planar coil 30, the magnetic sheet 40, and the heat sink/magnetic shield plate 50 protrude from the front side 101 of the substrate 100, the primary coil and the secondary coil are easily disposed adjacently when performing non-contact power transmission.

3. Modification

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

Figure 6:
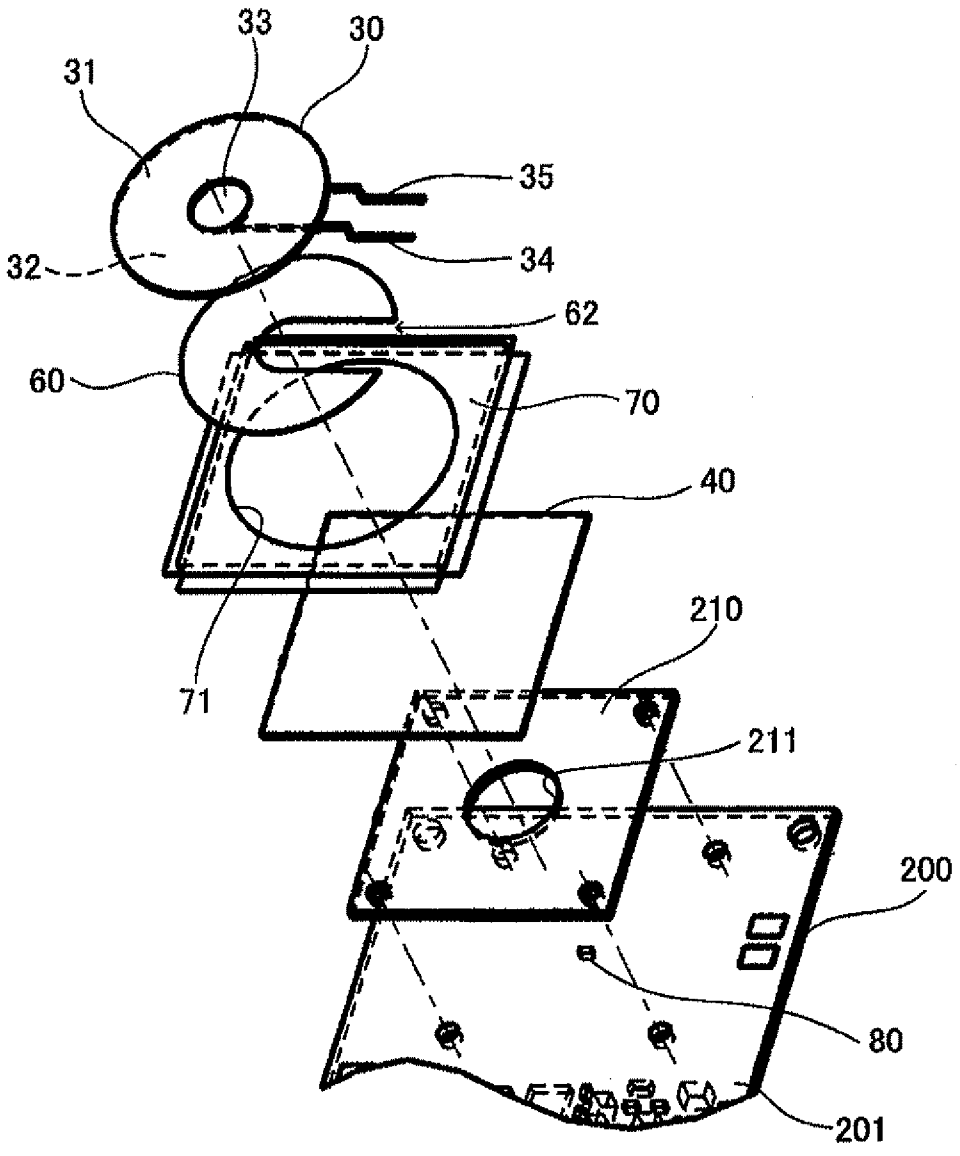
FIG. 6 is a view showing a modification in which a temperature detection element is provided on the front side of a substrate.

The above embodiments have been described taking an example relating to non-contact power transmission. Note that the invention may be similarly applied to non-contact signal transmission utilizing an electromagnetic induction principle. As shown in FIG. 6, the temperature detection element 80 may be provided on a front side 201 of a substrate 200. In this case, a heat sink/magnetic shield plate 210 having a hole 211 (see FIG. 6) may be used instead of the heat sink/magnetic shield plate 50 shown in FIG. 2. Since the hole 211 is formed corresponding to the air-core section 33 of the planar coil 30, the heat sink effect does not deteriorate. Since the hole 211 is formed in the heat sink/magnetic shield plate 210, the temperature detection element 80 does not interfere with the heat sink/magnetic shield plate 210 even if the temperature detection element 80 is provided on the front side 201 of the substrate 200. In this case, it suffices that the heat transfer conductive pattern (omitted in FIG. 6) be formed on the front side 201 of the substrate 100 in the area that faces the heat sink/magnetic shield plate 210. A depression may be formed instead of the hole 211 formed in the heat sink/magnetic shield plate 210 insofar as interference with the temperature detection element 80 does not occur. The heat sink/magnetic shield plate 210 shown in FIG. 6 may be used instead of the heat sink/magnetic shield plate 50 shown in FIG. 2.

A plurality of magnetic sheets 40 shown in FIGS. 2 and 6 may be provided. When magnetic saturation occurs using only one magnetic sheet 40 when a large current flows through the planar coil 30 (e.g., when power is turned ON), a leakage flux can be reduced by providing a plurality of magnetic sheets 40.

A planar coil is suitable as the coil in order to reduce the thickness of the coil unit. Note that the invention is not limited thereto. A planar coil formed by winding a coil wire around a planar core formed using a planar magnetic material may also be used.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A coil unit comprising:

a planar coil that has a transmission side and a non-transmission side;

a magnetic sheet provided over the non-transmission side of the planar coil; and a heat sink/magnetic shield plate stacked on a side of the magnetic sheet opposite to a side that faces the planar coil, thus forming a stack direction, the heat sink/magnetic shield plate dissipating heat generated by the planar coil and shielding magnetism by absorbing a magnetic flux that has not been absorbed by the magnetic sheet, the heat sink/magnetic shield plate being formed of a non-magnetic material, and the heat sink/magnetic shield plate having a thickness larger than that of the magnetic sheet in the stack direction.

2. The coil unit as defined in claim 1, the coil unit further including:

a substrate, the heat sink/magnetic shield plate being secured on the substrate; and a temperature detection element provided on the substrate, the temperature detection element detecting the temperature of the planar coil due to heat generation that is transferred through solid heat conduction of the magnetic sheet and the heat sink/magnetic shield plate.

3. The coil unit as defined in claim 2, heat transfer conductive patterns being formed on a front side and a back side of the substrate, the front side facing the heat sink/magnetic shield plate; and the temperature detection element being provided on the back side of the substrate.

4. The coil unit as defined in claim 3, the heat transfer conductive patterns formed on the front side and the back side of the substrate being connected via a through-hole formed through the substrate.

5. The coil unit as defined in claim 2, a depression being formed in a side of the heat sink/magnetic shield plate that faces the substrate; and the temperature detection element being provided on a front side of the substrate and disposed inside the depression formed in the heat sink/magnetic shield plate, the front side of the substrate facing the heat sink/magnetic shield plate.

6. The coil unit as defined in claim 5, a heat transfer conductive pattern being formed on the front side of the substrate.

7. The coil unit as defined in claim 2, the temperature detection element being an element that breaks or suppresses power supplied to the planar coil based on the temperature of the planar coil due to heat generation.

8. The coil unit as defined in claim 1, the coil unit further including a covering member that covers an edge of the magnetic sheet.

9. The coil unit as defined in claim 2, the coil unit further including a protective sheet having a hole that receives the planar coil, the protective sheet covering edges of the magnetic sheet and the heat sink/magnetic shield plate and securing the magnetic sheet and the heat sink/magnetic shield plate on a front side of the substrate.

10. The coil unit as defined in claim 1, the coil unit including a plurality of the magnetic sheets, the thickness of the heat sink/magnetic shield plate being larger than the total thickness of the plurality of magnetic sheets.

11. The coil unit as defined in claim 1, the planar coil having an inner end lead line and an outer end lead line, the inner end lead line being provided over the non-transmission side of the planar coil; and a spacer member being disposed between the planar coil and the magnetic sheet, the spacer member having a thickness substantially equal to the thickness of the inner end lead line, and a slit being formed in the spacer member at a position at which the inner end lead line is provided.

12. The coil unit as defined in claim 3, the substrate having a mounting surface provided with a mounted component in an area that extends from an area that faces the heat sink/magnetic shield plate, the mounting surface being provided on the back side of the substrate.

13. An electronic instrument comprising the coil unit as defined in claim 1.

14. A coil unit comprising:

a planar coil;

a magnetic sheet; and a heat sink/magnetic shield plate that has a thickness larger than that of the magnetic sheet in a stack direction, the magnetic sheet being provided between the planar coil and the heat sink/magnetic shield plate in the stack direction, and the heat sink/magnetic shield plate dissipating heat generated by the planar coil and shielding magnetism by absorbing a magnetic flux that has not been absorbed by the magnetic sheet.

* * * * *